(12) United States Patent
Latvys (10) Patent No.: US 10,377,611 B2
(45) Date of Patent: Aug. 13, 2019

(54) SCISSORS LIFT WITH HEIGHT SENSOR SYSTEM

(71) Applicant: ADVANCE LIFTS, INC., St. Charles, IL (US)

(72) Inventor: Evaldas Latvys, Itasca, IL (US)

(73) Assignee: ADVANCE LIFTS, INC., St. Charles, IL (US)

( * ) Notice: Subject to any disclaimer, the term of this patent is extended or adjusted under 35 U.S.C. 154(b) by 273 days.

(21) Appl. No.: 15/337,018

(22) Filed: Oct. 28, 2016

(65) Prior Publication Data

US 2018/0118538 A1 May 3, 2018

(51) Int. Cl.
*B66F 7/06* (2006.01)
*B66F 7/08* (2006.01)
*B66F 7/28* (2006.01)
*G01D 5/14* (2006.01)

(52) U.S. Cl.
CPC ............ *B66F 7/065* (2013.01); *B66F 7/08* (2013.01); *B66F 7/28* (2013.01); *G01D 5/145* (2013.01); *B66F 2700/123* (2013.01)

(58) Field of Classification Search
CPC .......... B66F 11/042; B66F 3/22; B66F 3/245; B66F 7/06–0691
See application file for complete search history.

(56) References Cited

U.S. PATENT DOCUMENTS

| | | | |
|---|---|---|---|
| 4,499,541 A | 2/1985 | Yuki et al. | |
| 4,707,695 A | 11/1987 | Takahashi et al. | |
| 5,025,892 A * | 6/1991 | Stelzl | B66F 7/0625 187/210 |
| 5,481,769 A * | 1/1996 | Schneider | A47C 20/041 5/424 |
| 5,695,173 A * | 12/1997 | Ochoa | B66F 7/065 254/10 C |
| 6,104,480 A * | 8/2000 | Matzo | G01B 5/24 33/471 |
| 6,286,629 B1 * | 9/2001 | Saunders | B66B 9/0853 187/394 |
| 6,857,493 B2 | 2/2005 | Shupp et al. | |
| 7,213,686 B2 | 5/2007 | Kaufman | |
| 7,219,770 B2 | 5/2007 | Baker | |
| 9,133,976 B2 | 9/2015 | Lin et al. | |
| 9,193,573 B1 | 11/2015 | Troy | |
| 9,376,296 B2 | 6/2016 | Nussbaum | |

(Continued)

FOREIGN PATENT DOCUMENTS

DE 3527324 A1 * 2/1987 .............. B66F 7/065

*Primary Examiner* — Tyrone V Hall, Jr.
(74) *Attorney, Agent, or Firm* — Marshall, Gerstein & Borun LLP (57) ABSTRACT

A scissor lift with a height sensor system includes a scissors assembly including at least one scissor leg configured to lower and raise a platform, an angle sensor configured to sense the angular position of a pivot pin about which the scissor leg pivots, and a processor configured to calculate a height of the platform from the angular position sensed by the angle sensor. The processor may also be configured to control the lift actuator in response to the height of the platform calculated from the angular position sensed by the angular sensor. The angle sensor may be a magnetic angle sensor configured to sense the angle of a magnetic angular marker attached to the pivot pin.

20 Claims, 4 Drawing Sheets

(56) References Cited

U.S. PATENT DOCUMENTS

| | | | |
|---|---|---|---|
| 2003/0150657 A1* | 8/2003 | Shupp | B60T 7/16 |
| | | | 180/168 |
| 2013/0213744 A1* | 8/2013 | Foley | B66F 7/0625 |
| | | | 187/276 |
| 2014/0014886 A1 | 1/2014 | Ruth sen | |
| 2015/0321891 A1 | 11/2015 | Mohr | |
| 2015/0375896 A1 | 12/2015 | Taylor et al. | |

\* cited by examiner

SCISSORS LIFT WITH HEIGHT SENSOR SYSTEM

FIELD OF THE DISCLOSURE

The present disclosure relates generally to a scissors lift, and more particularly, to a scissors lift with a height sensor system.

BACKGROUND

Lifts are used in a variety of different applications to raise and lower objects and/or people from a first elevation to at least a second elevation. In an industrial setting (e.g., a factory or warehouse), a lift may be used to transport heavy machinery and pallets of goods to and from balconies, mezzanines, basements, and/or between floors. Three types of lifts commonly used in an industrial setting are vertical reciprocating conveyors (VRCs), elevators, and scissor lifts.

A VRC typically includes a platform that supports the cargo and a pair of spaced apart vertical guide columns which guide the platform along a vertical path between the lower and upper levels. Fewer or more vertical guide columns may be utilized by the VRC (e.g., three or four vertical guide columns) depending on the application and type of cargo. Some VRCs employ a single mast from which the platform is cantilevered. To change the height of the platform, most VRCs employ an automated pulley that is mounted on a crossbar spanning the vertical guide columns and connected to the platform via a belt or chain. In general, safety regulations limit VRCs to carrying cargo and not passengers.

An elevator generally includes an enclosed car having a retractable door, a counterweight, a hoistway or shaft through which the car travels, a drive system, and various safety features that prevent free fall such as brakes and a governor. The safety features and design of an elevator make it suitable for human passengers, but the costs of installing and maintaining the elevator as well as other functional limitations may outweigh the benefit of human passengers in some industrial applications.

Scissor lifts employ a plurality of linked, folding supports arranged in a generally crisscross pattern that form one or more pantograph assemblies to operatively connect the platform to a base. The platform is raised by applying pressure to at least one of the folding supports in a manner that elongates the crisscross pattern and thereby propels the platform vertically. Descent is accomplished by collapsing the crisscross pattern. The crisscross pattern of folding supports is fairly resistant to sway and thus results in a relatively stable platform. As such, regulations typically allow an operator of a scissor lift to ride on the platform together with the cargo.

One common way to power a scissor lift is to provide a hydraulic actuator that exerts pressure on one of the folding supports to move the folding support into an upright position. The other folding supports, by virtue of their linked connection to the actuated folding support, are also moved upright, thereby causing the entire crisscross pattern of folding supports to elongate and push the platform in the upward direction.

It is desirable to be able to calculate the height of the platform without necessarily directly measuring the height of the platform itself. This can be useful for controlling the scissor lift to position the platform at a desired height.

SUMMARY

According to some aspects of the disclosure, a scissors lift with a height sensor system includes a scissors assembly including at least one scissor leg configured to lower and raise a platform, an angle sensor configured to sense the angular position of a pivot pin about which the scissor leg pivots, and a processor configured to calculate a height of the platform from the angular position sensed by the angle sensor.

In one exemplary arrangement, a scissors lift with a height sensor system includes a base, a platform, a scissors assembly, a lift actuator, an angle sensor, and a processor. The platform is movable between a first height and a second height. The scissors assembly includes at least one pivotally connected scissor leg and operatively connects the base with the platform. The scissors assembly is configured to lower and raise the platform relative to the base. The lift actuator is configured to pivot, either directly or indirectly, the scissor leg about a pivot pin to selectively raise and lower the platform. The angle sensor is configured to sense the angular position of the pivot pin. The processor is configured to calculate a height of the platform from the angular position sensed by the angle sensor. Optionally, the processor may also be configured to control the lift actuator in response to the height of the platform calculated from the angular position sensed by the angular sensor.

In some arrangements, the pivot pin may be secured to the scissor leg to rotate with the scissor leg, and the angle sensor may be held in a fixed position adjacent the pivot pin. In other arrangements, the angle sensor may be secured to the scissor leg to rotate with the scissor leg, and the pivot pin may be held in a fixed position adjacent the pivot pin.

In some arrangements, an angle position marker may be disposed at a distal end of the pivot pin. The angle sensor may be disposed immediately opposite and facing the angle position marker. The angle sensor may sense the angular position of the angle position marker. The angle sensor may include a magnetic sensor that senses the angular position of a magnet. The angle position marker may include a magnet that uniquely identifies the angular rotation of the pivot pin. The magnet may be a permanent magnet or another type of magnet. The magnetic sensor may include a Hall effect sensor. In some arrangements, the angle sensor may include an optical sensor that optically senses the angular position of the angle position marker.

In some arrangements, the scissors lift may include a clevis that couples the scissor leg to the base. The pivot pin may extend from the scissor leg through a bore in the clevis. The angle sensor may be attached to the clevis. The clevis may include a first support flange spaced apart from a second support flange with a gap defined between the first and second support flanges. The angle sensor may be attached to the first support flange, and the pivot pin may extend through the second support flange. The angle sensor may face the distal end of the pivot pin across the gap. The angle sensor may be axially aligned with the longitudinal axis of the pivot pin.

In some arrangements, the pivot pin is part of a pin assembly including a pin flange, a bearing shaft extending from the pin flange, and an angle position marker readable by the angular sensor and disposed at a distal end of the bearing shaft. The pin flange may be secured to the scissor leg. The bearing shaft may rotate with and support the scissor leg, and the angle position marker may rotate with the bearing shaft. The angle position marker may be carried by a retainer plug fixed in the distal end of the bearing shaft. The bearing shaft and/or the retainer plug may be made of non-ferrous materials.

In some arrangements, the scissors lift may include an operator control interface operatively connected to the processor to provide input commands to the processor for controlling the height of the platform.

In some arrangements, the scissors assembly may include at least one pair of scissor legs pivotably connected in the form of an X, wherein the scissor leg is one of the pair of scissor legs. In other arrangements, the scissors assembly may include at least two such pairs of scissor legs aligned in parallel with each other, for example, supporting opposite sides of the platform. One or more additional such pairs of scissor legs may be connected in series to the end of one or both of the first and second pairs of scissor legs. Other arrangements of scissor legs configured to support, raise, and lower the platform are also possible.

These and additional aspects of the disclosure, arrangements, and/or features will become apparent upon studying the following detailed description of an exemplary arrangement and the accompanying drawings.

DETAILED DESCRIPTION

In some aspects, a scissors lift is provided a height sensor and/or control system that includes a magnetic angle sensor that senses the angular position of a pivot pin of one of the scissor legs and converts that angle measurement into a height measurement of a platform at the top of the scissors lift. The pivot pin may be any one of the pivot pins that rotates correspondingly with angular rotation of the scissor leg as the scissor legs extend and retract to move the platform up and/or down. In one arrangement, the pivot pin connects one of the bottom scissor legs with the base of the scissors lift. However, the magnetic angle sensor may be configured to sense the angular position of other ones of the pivot pins as long as the pivot pin and the angular sensor are arranged to sense the angular movement of either the pin or the angular sensor that directly correlates to angular movement of the scissor leg or legs.

In some arrangements, a magnetic marker is attached to the end of the pivot pin and rotates with the pivot pin. The magnetic angle sensor is positioned adjacent to the magnetic marker and held in position by a bracket. The magnetic angle sensor includes a Hall effect type magnetic sensor that senses the angular position of the magnetic marker (and thus also of the pivot pin).

Readings from the magnetic angle sensor are provided to a processor, which is programmed to convert the angular readings into an absolute height of the scissors lift through mathematical calculations. The height calculations can be used for controlling the height of the scissors lift. For example, the height calculation may be used by a processor to send control instructions to a lift drive to move the lift up and/or down to a desired height.

Other types of angle sensors may be used, and other physical arrangements of the angle sensor relative to the pivot pin are also possible, as discussed in further detail herein.

Figure 1:
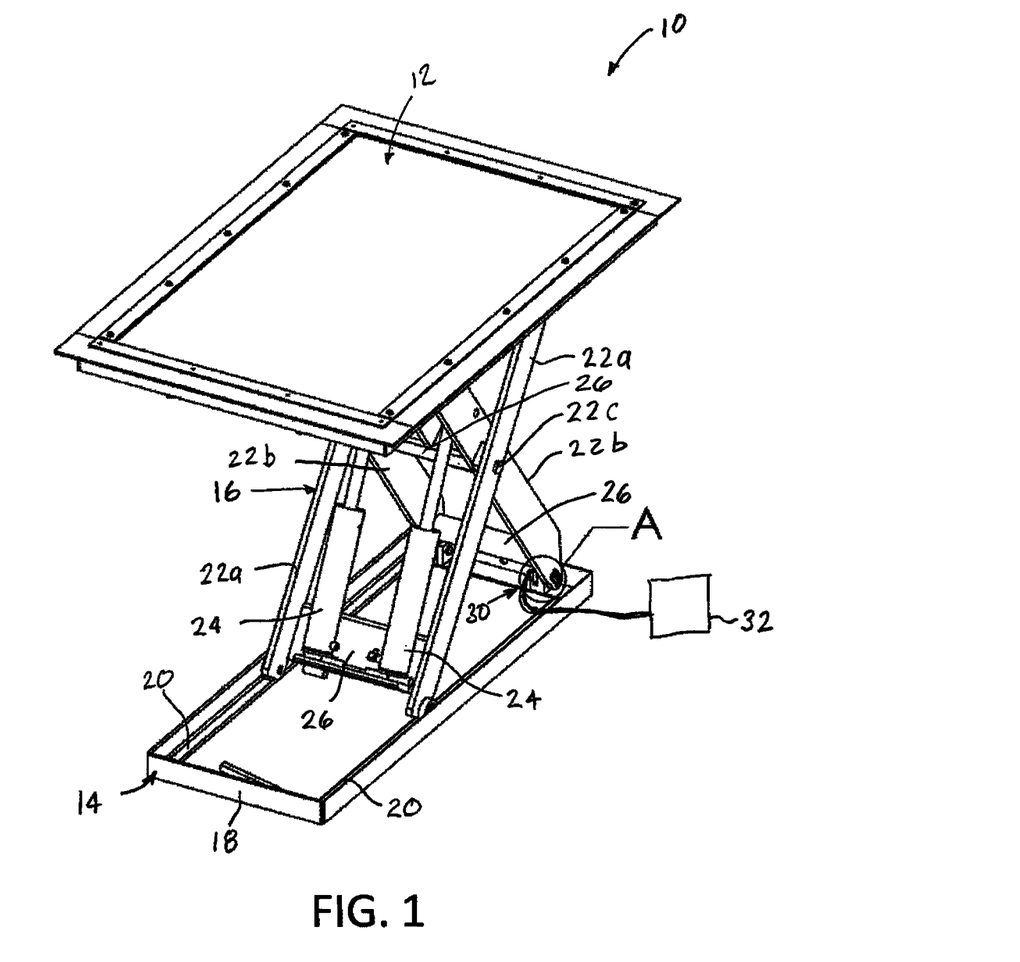
FIG. 1 is an isometric view of a scissors lift according to one aspect of the disclosure in a fully raised position.
Figure 2:
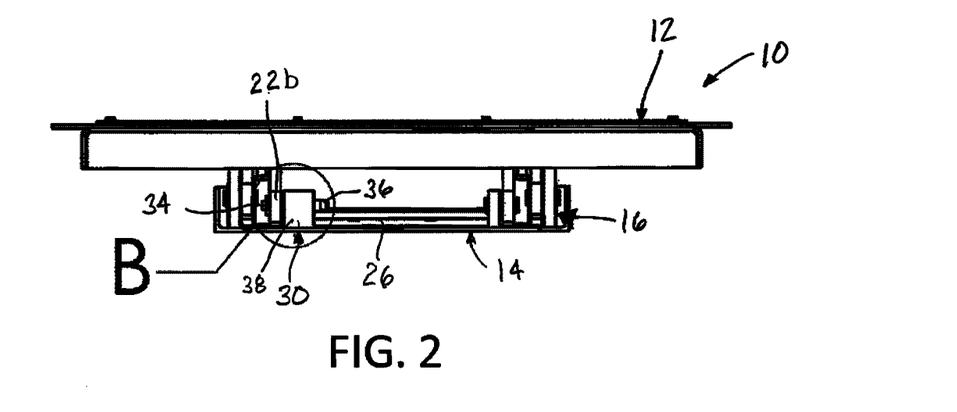
FIG. 2 is an end view of the scissors lift in a fully lowered position.
Figure 3:
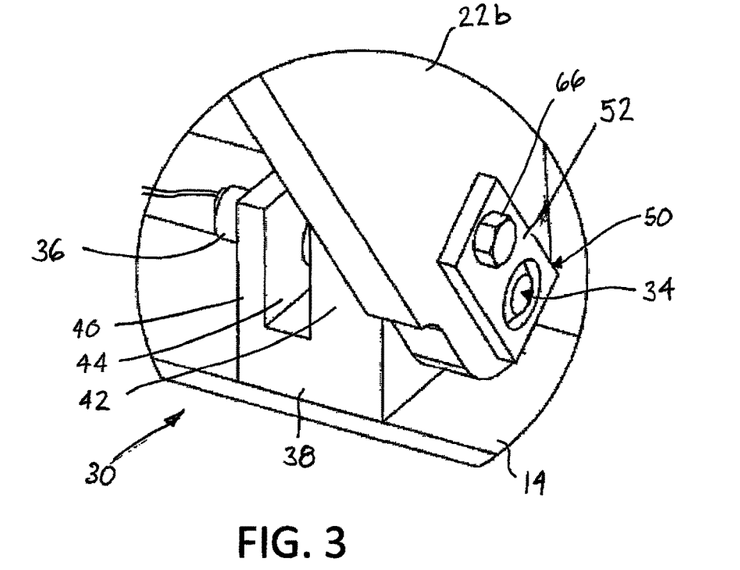
FIG. 3 is an enlarged view of the sensor assembly installed on the scissors lift in the circled portion A of FIG. 1.
Figure 4:
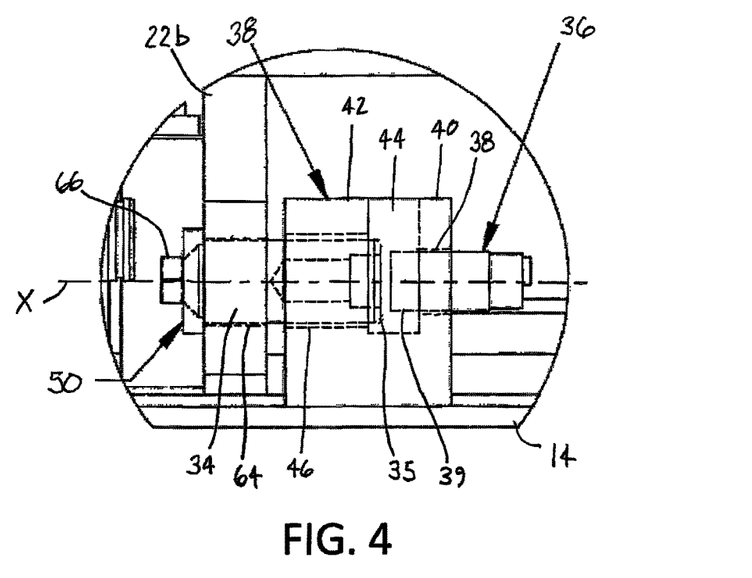
FIG. 4 is an enlarged detail view of the sensor assembly in the circled portion B of FIG. 2.
Figure 5:
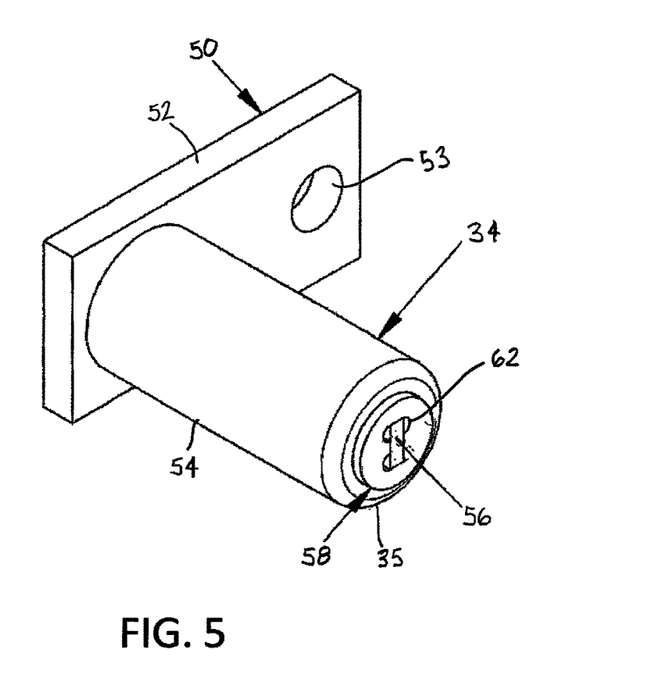
FIG. 5 is an enlarged isometric view of a pin assembly of the angle sensor in isolation.

Turning now to the exemplary arrangement of the drawings, FIGS. 1-6 illustrate one exemplary embodiment of a scissors lift 10 having a height sensor and/or control system according to the present disclosure. The scissors lift 10 includes a platform 12, a base 14, and a scissors assembly 16 that moves the platform 12 up and down relative to the base 14. The scissors assembly 16 is configured to move the platform 12 between a fully lowered position (i.e., fully retracted scissors assembly) as shown in FIG. 5 and any one or more intermediate raised positions to a fully raised position (i.e., fully extended scissors assembly) as shown in FIG. 1. The height sensor and/or control system is configured to calculate the height of the platform 12 relative to the base 14. Optionally, the height sensor and/or control system is preferably also configured to use the calculated height of the platform 12 to control movement of the scissors assembly 16 and thereby control the height of the platform 12.

The base 14 may take any form suitable for operably supporting the scissors assembly 16 so that the scissors assembly 16 can extend and retract. In this example, the base 14 is in the form of a rectangular frame 18 that forms two parallel tracks 20 that support the scissors assembly 16. The rectangular frame 18 may be formed for example of steel angle sections or other materials or other shaped members. The tracks 20 may simply be formed by the flanges of the angle sections. However, any other form of the frame 18 suitable for operably supporting the scissors assembly 16 and forming the tracks 20 may be used. Similarly, the platform 12 may take any form suitable for being operably supported by the scissors assembly 16 to be able to raise and lower the platform 12. In this example, the platform 12 includes a deck suitable for supporting a load that rests upon the top end of the scissors assembly 16 and includes appropriate tracks similar to the tracks 20 to allow the scissors assembly 16 to extend and retract. However, other forms of the platform 12 may be used.

The scissors assembly 16 is formed by a plurality of pivotally connected scissor legs 22 arranged in a crisscross pattern that form one or more pantograph assemblies, and one or more lift actuators 24 configured to extend and retract the scissors assembly 16. In this example, the scissors assembly 16 includes two parallel pairs of pivotably connected scissor legs 22a and 22b, a left pair and a right pair, each pair of scissor legs 22a/b pivotally connected with each other by a central pivot pin 22c through a middle portion of the legs. Thus, each pair scissor legs 22a/b forms an X such that the pair of scissor legs 22/b can pivot about the pivot pin. The left pair of scissor legs 22a/b is connected to the right pair of scissor legs 22a/b by one or more cross members 26 such that the left pair of scissor legs and the right pair of scissor legs extend and retract in tandem. The lift actuators 24 in this example include a pair of hydraulic cylinders, each cylinder having one end operably coupled to a cross member 26 between one parallel set of scissor legs 22 and the opposite and operably coupled to a cross member 26 between the other parallel set of scissor legs 22 such that extending or retracting the hydraulic cylinders causes the scissor legs 22 to rotate about the central pivot pin 22c and thereby extend or retract the scissors assembly 16 accordingly. However, any other type of lift actuator 24 capable of pivoting the pairs of scissor legs 22a/b may be used. Furthermore, although the present example includes two pairs of scissor legs 22, additional pairs of scissor legs, either parallel to or in a series extension to the illustrated scissor legs could be used, and the disclosure is not limited to any one particular scissors assembly arrangement. Rather, the height sensor and/or control system of the present disclosure may be implemented with virtually any type of scissors lift arrangement.

The height sensor and/or control system includes a sensor assembly 30 (FIGS. 3-6) configured to sense rotational movement and/or position of one or more of the scissor legs 22 via the angular position of a pivot pin and a processor 32 (FIG. 7) configured to calculate the height of the platform 12 based on the sensor readings received from the sensor assembly 30, and optionally to also provide control instructions for the lift actuators 24 based on the calculated height. In the exemplary arrangement, the sensor assembly 30 is configured to sense angular rotational movement of a pivot pin 34 that pivotably connects a first one of the scissor legs 22b to the base 14. As the lift actuators 24 extend or retract the scissors assembly 16, the scissor leg 22b rotates about the longitudinal axis X of pivot pin 34. The pivot pin 34 is rotationally fixed to the scissor leg 22b and thereby configured to rotate about its longitudinal axis simultaneously and in direct correlation with the rotation of the scissor leg 22b. As the pivot pin 34 rotates with the scissor leg 22b, the angle sensor 36 senses the angular position of the pivot pin 34 about its axis. In other arrangements, the angle sensor 36 could be configured to rotate in direct correlation to the pivoting of the scissor leg 22b and a rotational or angle position marker to be read by the angle sensor 36 could be held in a fixed position. In either arrangement, the angle sensor 36 senses the angular position of the pivot pin 34, and by correlation, the angular position of the scissor leg 22b. The sensed rotational position of the pivot pin 34 relative to the angle sensor 36 is provided to the processor 32, which is configured to convert the angular position to a calculated height reading of the platform 12 by any suitable calculation method.

As best seen in FIGS. 3-6, the bottom end of the scissor leg 22b is rotationally coupled to the base 14 by a clevis 38 and the pivot pin 34. The clevis 38 is fixed to the base 14 and includes a pair of support flanges 40 and 42 extending upwardly from a base portion. The support flanges 40 and 42 are spaced apart from each other and separated by a gap 44. The scissor leg 22b is pivotably coupled to the support flange 42 by the pivot pin 34. In particular, the pivot pin 34 is rotationally fixed to and extends laterally inwardly from the lateral inner surface of the scissor leg 22b and is journaled within a through bore 46 extending laterally through the support flanges 42. The distal end 35 of the pivot pin 34 extends into the gap 44, but preferably does not extend across the entire width of the gap 44, as best seen in FIG. 4. The angle sensor 36 is carried by the support flange 40 axially aligned with and along the axis X and immediately adjacent the distal end of the pivot pin 34. In this arrangement, the angle sensor 36 is disposed through a second bore 48 through the support flange 40, wherein the bore 48 is axially aligned with the bore 46. The angle sensor 36 is fixed in position in the support flange 40 such that it does not rotate or move axially relative to the support flange 40 or the pivot pin 34. Preferably, the angle sensor 36 is fixed in the bore 48 of the support flange 40, such as by lock nuts, jam nuts, or other fastening mechanisms, such that the sensing end 39 of the angle sensor is disposed within the gap 44 axially aligned with and spaced a small distance apart from the distal end of the pivot pin 34, for example less than about 2 cm apart, preferably less than about 10 mm apart, and more preferably between about 3 mm and 1 mm apart. Thus, as the pivot pin 34 rotates angularly about its longitudinal axis X, the angle sensor 36 remains fixed and can sense the angular position and/or change an angular position of the pivot pin 34.

Figure 6:
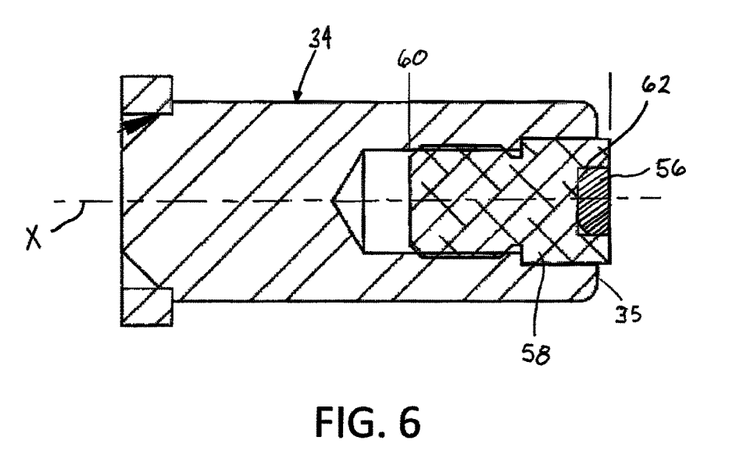
FIG. 6 is a cross-sectional view of the pin assembly of FIG. 5 along the longitudinal axis of the pin.

In this exemplary arrangement, the angle sensor 36 is a magnetic sensor that can sense changes in a magnetic field in its area. As best seen in FIGS. 5 and 6, in this particular example, the pivot pin 34 is part of a pin assembly 50 that includes a pin flange 52, a bearing shaft 54, and a rotational or angle position marker 56 that is operatively readable by the angle sensor. In this arrangement, the angle sensor 36 is a magnetic sensor and the angle position marker 56 is a permanent magnet or other type of suitable magnet; however, other types of angular sensing systems may be used. The pin flange 52 is formed of a flat elongate member, such as a piece of flat steel or iron, and has an eyehole 53 through one end of the elongate member and the bearing shaft 54 extending laterally from the other end of the elongate member. In this arrangement, the bearing shaft 54 forms the pivot pin 34, and is preferably formed of chrome plated steel to improve the friction and bearing characteristics, although other materials may also be suitable. The angle position marker 56 is fixed into the distal end 35 of the bearing shaft 54 so as to rotate with the bearing shaft 54 by any suitable method. In this arrangement, as best seen in FIG. 6, the angle position marker 56 is carried by a retainer plug 58, which is preferably threaded to thread into a threaded bore 60 extending axially into the distal end 35 of the bearing shaft 54. The angle position marker 56 is disposed at the distal end of the retainer plug 58. In this arrangement, the angle position marker 56 is a permanent magnet fixed within a cavity 62 having the form of a slotted recess in the distal end of the retainer plug 58. As best seen in FIG. 5, the angle position marker 56 permanent magnet is preferably disposed with its north-south magnetic axis aligned along a diameter of the bearing shaft 54 and/or the retainer plug 58 in order to provide an easily readable angular magnetic signature that can be read by the angle sensor 36. In this arrangement, the permanent magnet 56 is disposed with its north-south axis aligned generally parallel to the left end of the pin flange 52. However, the permanent magnet may be affixed to the distal end of the bearing shaft 54 in other orientations and by any suitable fixation method. The retainer plug 58 is preferably formed of aluminum or some other non-magnetic, non-ferrous material. This way, the permanent magnet is the only, or at least the strongest, magnetic field in the region around the distal end 35 of the pivot pin 34 within the gap 44 so as to provide accurate magnetic readings by the angle sensor 36. In other arrangements, a non-permanent magnet, such as an electro magnet, could be used in place of or in addition to the permanent magnet.

As best seen in FIGS. 3 and 4, the pin assembly 50 is attached to the scissor leg 22b with the bearing shaft 54 extending through a bore 64 through the lower end of the scissor leg 22b and the bore 46 of the support flange 42, and with the pin flange 52 secured to the laterally exterior side of the scissor leg 22b. A fastener 66, such as a bolt or screw, is disposed through the eyehole 53 and fixed to the support flange 42. The bearing shaft 54 is rotationally fixed to the pin flange 52 in any suitable manner such that, as the pin flange 52 rotates angularly with the scissor leg 22b, the bearing shaft 54 also rotates within the bore 46 of the support flange 42. In this manner, the angle position marker 56 rotates angularly in direct relation to the rotation of the scissor leg 22b as the scissors assembly 16 extends and contracts to raise and lower the platform 12. The angle sensor 36 includes a Hall effect type magnetic sensor that senses the angular position of the permanent magnet of the angle position marker 56. Therefore, the readings of the angle sensor 36 from the permanent magnet can be directly correlated through any of various mathematical formulae to the height of the platform 12. The angle sensor 36 is operatively coupled to the processor 32, for example with a wired or a wireless data connection, so as to provide the readings of the angle sensor 36 to the processor for use in calculating the height of the platform 12.

In another arrangement, the angle sensor 36 could be fixedly attached to the end of the pivot pin 34 to pivot with the scissor leg 22b and the permanent magnet 56 could be fixedly attached to the clevis 38, such as by being affixed in the bore 48 of the support flange 40. In this arrangement, the angle sensor 36 would rotate axially and the permanent magnet 56 would remained fixed. The angle sensor 36 still reads the angular position of the angle position marker 56 relative to the angle sensor, and provides the angle readings to the processor 32 for use in calculating the height of the platform 12.

Furthermore, the angle sensor 36 does not necessarily have to be a magnetic sensor, but could be or include another type of angular sensor, such as an optical sensor. In this case, the permanent magnet of the angle position marker 56 could be replaced with or supplemented by another type of optical rotational or angle position marker capable of indicating the angular rotational position of the pivot pin 34, such as an optical marker Turning now to FIG. 7, the sensing and control circuitry of the height sensor and/or system includes the angle sensor 36, the processor 32, an operator control interface 70, and a main power supply circuit 72. The angle sensor 36 is operatively coupled to the processor 32 so as to provide the sensor reading data, i.e., the sensed angle readings, from the angle sensor 36 to the processor 32. The operator control interface 70 is also operatively coupled to the processor 32 so that commands can be provided from the operator control interface 70 to the processor 32 to control the height of the platform 12. In this arrangement, the operator control interface 70 is in the form of a pushbutton control. However, the operator control interface 70 could take on any suitable operator control interface, such as a touchscreen, a general-purpose computer, or any other suitable human/machine interface for controlling the processor 32. The main power supply circuit 72 includes a transformer 76 and other related circuitry configured to provide a suitable supply power to the processor 32, the angle sensor 36, the operator control interface 70, and optionally any other electrically powered components on the scissors lift 10, such as a solenoid 78 for controlling the lift actuators 24.

Figure 7:
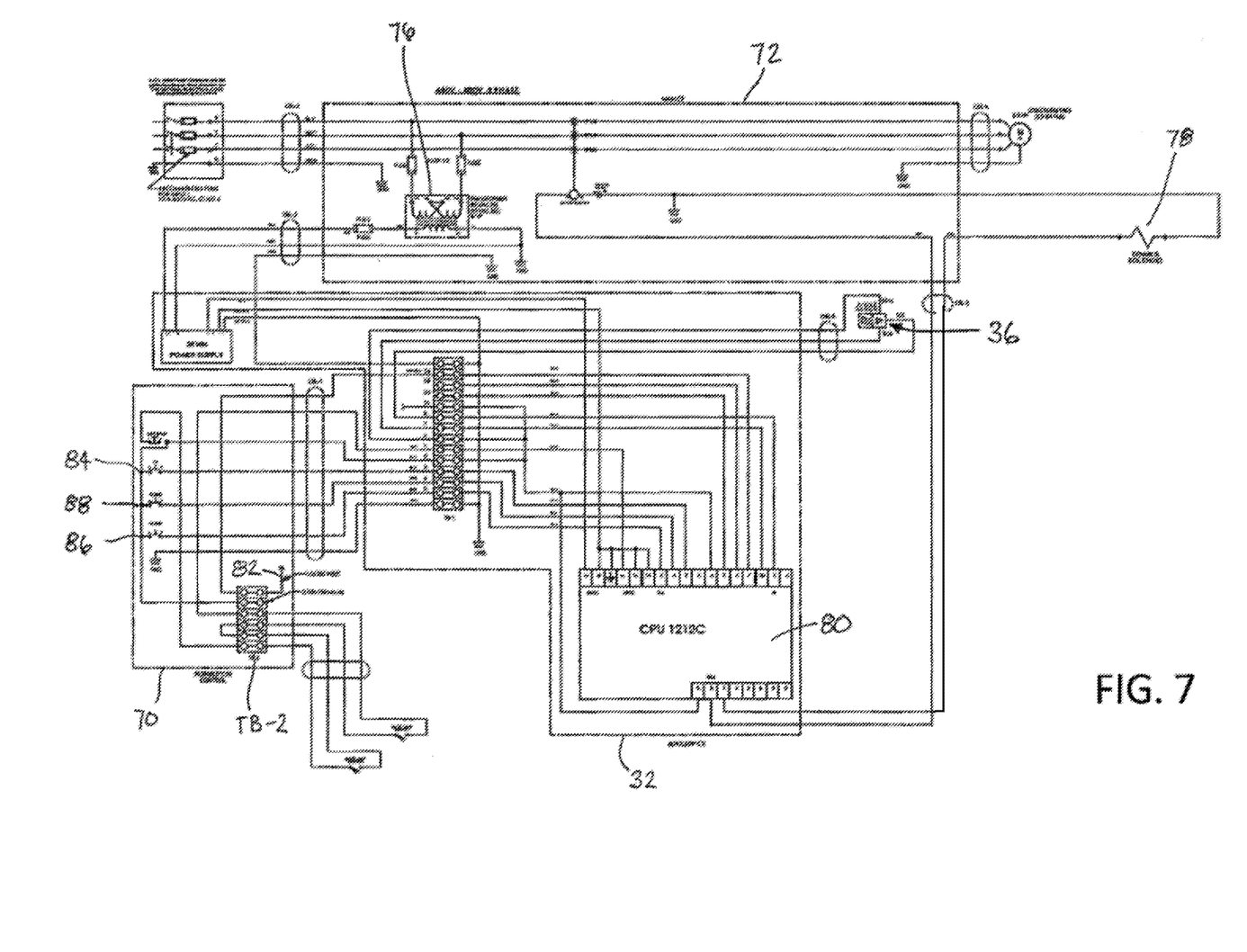
FIG. 7 is an electrical schematic diagram of a processor and related circuitry for calculating the height of the platform based on readings from the sensor assembly and/or controlling the height of the platform.

The processor 32 in this arrangement includes a central processing unit 80, such as a programmable logic circuits (PLC). The central processing unit 80 includes instructions and circuitry configured to convert the angle readings received from the angle sensor 36 into the corresponding height of the platform 12. This conversion can be calculated in any of many different ways. Additionally or alternatively, the PLC can be programmed or taught to correlate one or more angle sensor readings directly to corresponding specific heights of the platform 12, up to the granularity of data produced by the sensor and depending on the capacity and capability of the PLC and the arrangement of the overall control circuits. Regardless, because the angular position of the angle position marker 56 is directly correlated to the height of the platform 12, the processor 32 can continuously or intermittently calculate the height of the platform 12 directly from the angle readings received from the angle sensor 36. The calculated height of the platform 12 may be provided to a user, for example by being displayed on a screen or in some other manner useful to the user.

Additionally or alternatively, the calculated height of the platform 12 may be used by the processor 32 to control the up and/or down movement of the platform 12. For example, the processor 32 may use the calculated height of the platform to generate appropriate up and/or down drive signals for the lift actuators 24 to extend and/or retract the scissors assembly 16 so as to raise and/or lower the platform 12 to a particular selected target height entered by a user. The circuitry for providing the height control of the platform 12 may take any of many different suitable forms and/or implement any suitable algorithm.

To operably install the angle sensor 36 on the scissors lift 10, the platform 12 is raised to the fully raised position. The angle sensor 36 is installed into the clevis 38. Next, the angle sensor 36 is calibrated with the PLC program. In one possible method, a digital multimeter (DMM) is used to measure the output from the angle sensor 36 after being installed with the platform 12 in the fully raised position. The angle sensor 36 is rotated within the clevis until the DMM reads a pre-selected calibration reading. For example, with the circuit of FIG. 7, the angle sensor 36 may be rotated such that the DMM reads approximately 8.5 VDC. With the angle sensor 36 rotated such that it provides the pre-selected calibration reading, the angle sensor 36 is secured in the clevis 38 so as to be rotationally fixed in the clevis 38, and in particular about its longitudinal axis and the longitudinal axis X of the pivot pin 34, for example, with lock nuts or other fastening mechanism. With the platform 12 in the fully raised position and the angle sensor 36 so secured, the angle sensor 36 and the processor 32 are calibrated for the fully raised position in any suitable manner to calibrate the angle sensor's sensor output in the fully raised position to the PLC program. Thereafter, the platform 12 is lowered to the fully lowered position, and the angle sensor 36 and the processor 32 are calibrated for the fully lowered position in any suitable manner to calibrate the angle sensor's sensor output in the fully lowered position to the PLC program. Optionally, the steps for calibrating the angle sensor's output in each of the fully raised position and the fully lowered position may be repeated one or more times, which may improve the calibration accuracy. Any other suitable methods for calibrating the angle sensor 36 with the PLC program may be used. After performing the calibration, the scissors lift 10 is ready for use.

Optionally, the scissors lift 10 may also be calibrated for a pre-selected "home" position. To perform the home position calibration with the circuit of FIG. 7, the loose wire 82 is attached to the open terminal at TB-2, which allows the up and down pushbuttons 84, 86 to act as constant pressure controls stopping operation when released. The up and down pushbuttons are used to position the platform 12 at a selected home position. For example, the initial setting for the home position may be approximately in the mid-point of travel between the fully raised position and the fully lowered position. However, other positions may be used as a home position. With the platform positioned at the appropriate height at the home position, the "home" pushbutton 88 is momentarily depressed, which calibrates the position output from the angle sensor 36 to the PLC program. Thereafter, the wires are again disconnected. Any other suitable methods for calibrating the angle sensor with the PLC program may be used.

The scissors lift 10 with a height sensor and/or control system as described herein provides a relatively simple and inexpensive system for calculating the height of the platform 12 relative to the base 14, and optionally using that calculated height to provide control of the scissors assembly 16 to move the platform 12 into a desired height position.

While the present disclosure has been described with respect to certain embodiments, it will be understood that variations may be made thereto that are still within the scope of the appended claims.

What is claimed is:

1. A scissors lift with a height sensor system, comprising:
   a base;
   a platform movable between a first height and a second height;
   a scissors assembly that includes at least one pivotally connected scissor leg and operatively connects the base with the platform, wherein the scissors assembly is configured to lower and raise the platform relative to the base;
   a lift actuator configured to pivot the scissor leg about a pivot pin to selectively raise and lower the platform;
   an angle sensor fixed relative to the base and spaced from the pivot pin, wherein the angle sensor is configured to sense an angular position of the pivot pin; and
   a processor configured to calculate a height of the platform from the angular position sensed by the angle sensor.

2. The scissors lift of claim 1, wherein the pivot pin is secured to the scissor leg to rotate with the scissor leg, and the angle sensor is held in a fixed position adjacent the pivot pin.

3. The scissors lift of claim 2, wherein an angle position marker is disposed at a distal end of the pivot pin, wherein the angle sensor is disposed immediately opposite and facing the angle position marker, and the angle sensor senses the angular position of the angle position marker.

4. The scissors lift of claim 3, wherein the angle sensor is axially aligned with a longitudinal axis of the pivot pin.

5. The scissors lift of claim 4, further comprising a clevis that couples the scissor leg to the base, wherein the pivot pin extends from the scissor leg through a bore in the clevis, and the angle sensor is attached to the clevis.

6. The scissors lift of claim 5, wherein the clevis includes a first support flange spaced apart from a second support flange and a gap defined between the first and second support flanges, wherein the angle sensor is attached to the first support flange and the pivot pin extends through the second support flange, and wherein the angle sensor is axially aligned with and faces the distal end of the pivot pin across the gap.

7. The scissors lift of claim 3, wherein the angle position marker comprises a magnet and the angle sensor comprises a magnetic sensor that senses the angular position of the magnet.

8. The scissors lift of claim 7, wherein the magnet is a permanent magnet.

9. The scissors lift of claim 7, wherein the magnetic sensor comprises a Hall effect sensor.

10. The scissors lift of claim 1, wherein the processor is configured to control the lift actuator in response to the height of the platform calculated from the angular position sensed by the angle sensor.

11. The scissors lift of claim 10, further comprising an operator control interface operatively connected to the processor to provide input commands to the processor for controlling the height of the platform.

12. The scissors lift of claim 1, wherein the scissors assembly comprises at least one pair of scissor legs pivotably connected in the form of an X, wherein the scissor leg is one of the pair of scissor legs.

13. The scissors lift of claim 1, wherein the pivot pin extends through a first side to a second side of the scissor leg to enable the angle sensor to sense the angular position of the pivot pin.

14. The scissors lift of claim 1, further comprising first and second flanges, the angle sensor coupled to the first flange and the scissor leg coupled to the second flange via the pivot pin, a relative position of the first and second flanges to enable the angle sensor to sense the angular position of the pivot pin.

15. The scissors lift of claim 14, further comprising a clevis comprising the first and second flanges.

16. The scissors lift of claim 1, further comprising a flange coupled to the pivot pin, the flange coupled to the scissor leg to enable the pivot pin to rotate with the scissor leg.

17. A scissors lift with a height sensor system, comprising:
   a base;
   a platform movable between a first height and a second height;
   a scissors assembly that includes at least one pivotally connected scissor leg and operatively connects the base with the platform, wherein the scissors assembly is configured to lower and raise the platform relative to the base;
   a lift actuator configured to pivot the scissor leg about a pivot pin to selectively raise and lower the platform, wherein the pivot pin is secured to the scissor leg to rotate with the scissor leg;
   an angle sensor configured to sense an angular position of the pivot pin, the angle sensor is held in a fixed position adjacent the pivot pin, wherein the pivot pin comprises a pin flange, a bearing shaft extending from the pin flange, and an angle position marker disposed at a distal end of the bearing shaft, wherein the pin flange is secured to the scissor leg, the bearing shaft rotates with and supports the scissor leg, and the angle position marker rotates with the bearing shaft and is readable by the angle sensor; and
   a processor configured to calculate a height of the platform from the angular position sensed by the angle sensor.

18. The scissors lift of claim 17, wherein the angle position marker is carried by a retainer plug fixed in the distal end of the bearing shaft.

19. The scissors lift of claim 18, wherein the angle position marker comprises a magnet.

20. The scissors lift of claim 19, wherein the retainer plug is made of non-ferrous materials.

* * * * *